H. M. GREENER.
CULINARY IMPLEMENT.
APPLICATION FILED SEPT. 27, 1921.
1,397,512.
Patented Nov. 22, 1921.
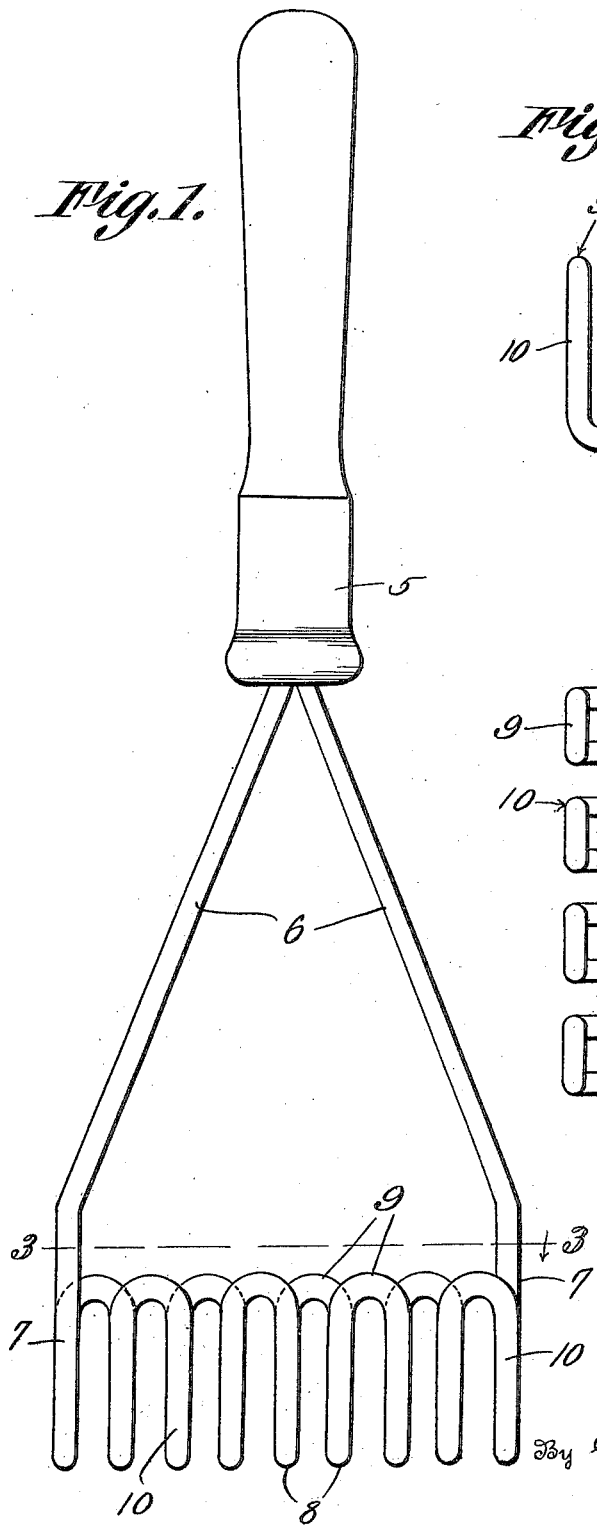
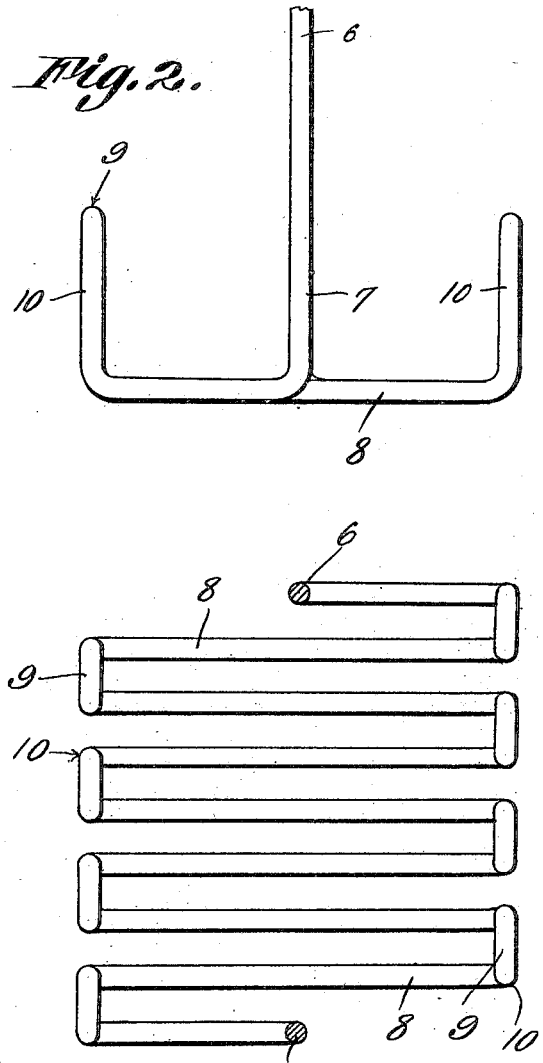

UNITED STATES PATENT OFFICE.

HERMAN M. GREENER, OF CHICAGO, ILLINOIS.

CULINARY IMPLEMENT.

1,397,512.   Specification of Letters Patent.   Patented Nov. 22, 1921.

Application filed September 27, 1921. Serial No. 503,490.

*To all whom it may concern:*

Be it known that I, HERMAN M. GREENER, a citizen of the United States, residing at the city of Chicago, in the county of Cook and State of Illinois, have invented certain new and useful Improvements in Culinary Implements, of which the following is a specification.

This invention relates to improvements in the culinary implement disclosed in my Patent No. 1,386,704 dated August 9, 1921, and its object is to simplify the device so that it may be more easily and cheaply manufactured.

The object stated is attained by means of a novel combination and arrangement of parts to be hereinafter described and claimed, and in order that the same may be better understood, reference is had to the accompanying drawing, wherein—

Figure 1 is a front elevation of the device; Fig. 2 is a side elevation of the dasher portion, and Fig. 3 is a horizontal section on the line 3—3 of Fig. 1.

Referring specifically to the drawing, 5 denotes a wooden or other simple handle which carries a dasher constructed of a single piece of wire and provided with a shank for attachment to the handle, the forward end of the latter having a longitudinal hole into which the shank is inserted and in which it is secured in any approved manner.

The shank of the dasher is composed of two laterally spaced side members 6 composed of a single piece of wire which is brought together at its ends for insertion into the handle. The members 6 diverge in the direction of their forward ends for some distance, and they then extend parallel to each other to their forward extremities, as shown at 7.

That portion of the wire which is between the extremities of the parts 7 is bent back and forth to obtain a plurality of spaced and parallel cross bars 8 joined by return bends 9. These cross bars, adjacent to the return bends joining the same, are bent to extend at right angles to the remaining portions of the cross bars, whereby the latter are provided with upstanding end portions 10.

Fig. 1 shows the device in position for lifting vegetables and other articles. The parts 7, 8 and 10 now form a rectangular basket-like structure, the parts 8 being the bottom, and the parts 7 and 10 the sides and preventing the articles from slipping off the former. As the basket is of openwork construction, it can be used for holding vegetables and other articles to allow water or other liquid to drain off the same.

When the device is to be used as a potato masher or creamer, it is reciprocated up and down while in the position shown in Fig. 1, the bottom grating formed by the parts 8 now being the active portion of the device. For beating eggs, the device is used in the same manner as an ordinary egg beater, the upstanding parts 10 now operating as dasher fingers.

The device can be very easily and cheaply produced as the entire dasher portion is made of a single piece of wire which can be readily bent into the shape shown.

I claim:

1. A culinary implement comprising a handle, and a dasher comprising a shank attached to the handle and consisting of laterally spaced side portions having at their extremities a transverse connecting portion consisting of spaced and parallel cross bars and return bends connecting the ends thereof, said cross bars adjacent to the return bends having upward bends forming upstanding end portions of the cross bars.

2. A culinary implement comprising a handle, and a dasher having a shank attached to the handle, and consisting of laterally spaced side portions having an integral transverse connecting portion at their extremities consisting of spaced and parallel cross bars connected in a continuous series by end return bends, said cross bars adjacent to the return bends having upward bends forming upstanding end portions of the cross bars.

In testimony whereof I affix my signature.

HERMAN M. GREENER.